June 3, 1952     T. M. BALL     2,599,425

TRANSMISSION CONTROL SWITCH

Filed Jan. 21, 1949     2 SHEETS—SHEET 1

INVENTOR.
Thomas M. Ball.
BY
Harness and Harris
ATTORNEYS.

June 3, 1952 T. M. BALL 2,599,425
TRANSMISSION CONTROL SWITCH
Filed Jan. 21, 1949 2 SHEETS—SHEET 2
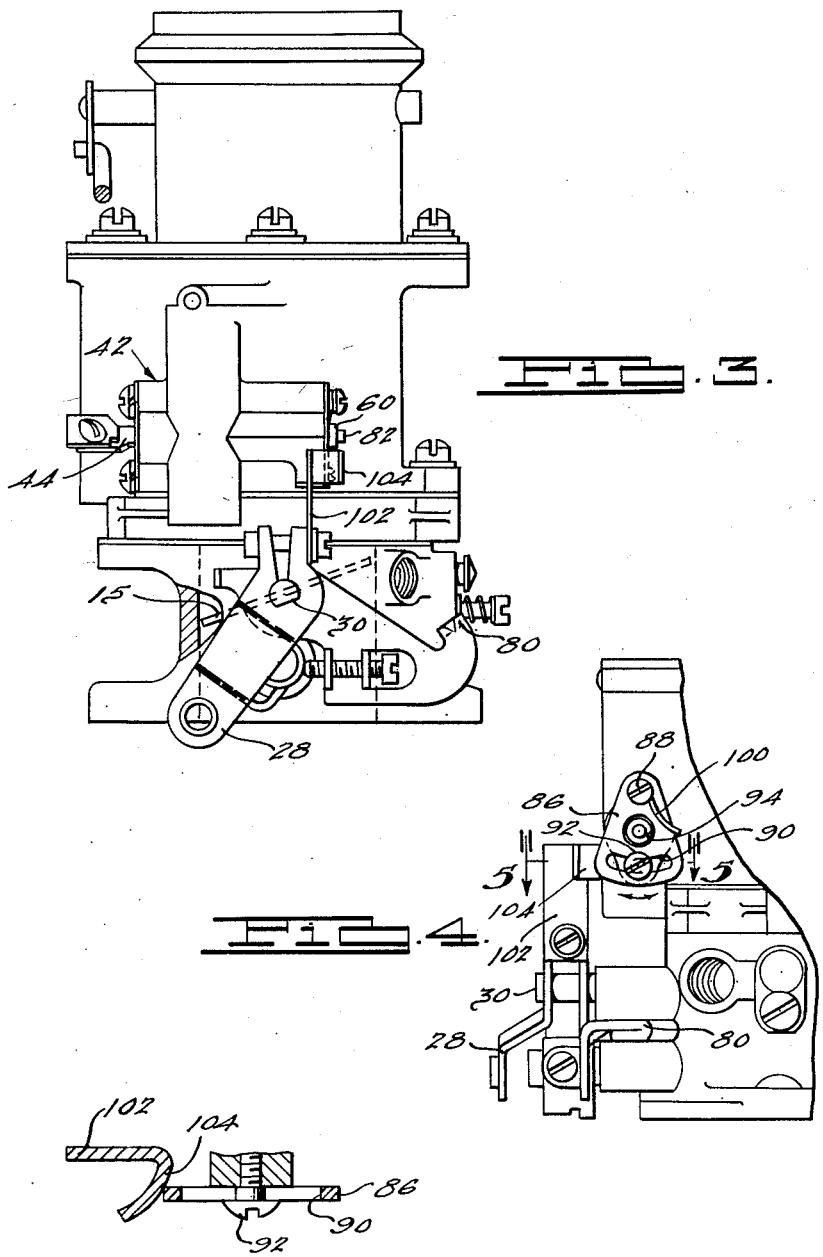
INVENTOR.
Thomas M. Ball.
BY
Harness and Harris
ATTORNEYS.

Patented June 3, 1952

2,599,425

UNITED STATES PATENT OFFICE 2,599,425

TRANSMISSION CONTROL SWITCH

Thomas M. Ball, Detroit, Mich., assignor to Chrysler Corporation, Highland Park, Mich., a corporation of Delaware Application January 21, 1949, Serial No. 71,871

6 Claims. (Cl. 200—59)

This invention relates to a transmission control mechanism for an automotive vehicle and more particularly to means to control the initiation of a change in transmission speed ratio drive.

Reference will be made herein to a relatively fastspeed drive which is usually the cruising drive for a vehicle. This may, for example, be a one to one driving speed ratio known as a direct drive or an overdrive. Reference will also be made to a relatively slow speed drive which is a vehicle accelerating speed ratio drive and may be a torque multiplying drive or where an overdrive is provided for the relatively fast speed drive the relatively slow speed drive may be a direct drive. The term kickdown, as used herein, refers to a downshift or step-down in the transmission as, for example, a downshift from the relatively fast speed drive to the relatively slow speed drive.

In automotive vehicles having automatic controls associated with variable speed ratio transmissions it has been found desirable to provide means responsive to control by the operator for reverting to a relatively slow speed drive when the operator is confronted with an emergency demanding fast acceleration. Such means have usually included a solenoid actuator and controls therefor including a switch which is arranged to cooperate with the engine carburetor throttle control mechanism so as to cause a change in speed ratio drive of the vehicle when the usual accelerator pedal is depressed to a predetermined position. It has also been found with such arrangements that under certain conditions as where the vehicle is traveling at a comparatively high rate of speed the transmission cannot be safely operated in a relatively slow speed drive as above described due to the excessive engine speed which would be required. Means have heretofore been provided for limiting the operation of such controls to those engine and vehicle speeds in which a relatively slow speed drive may be safely accommodated.

It is an object of this invention to provide a control for a variable speed ratio transmission by means of which a solenoid actuator associated with the transmission may be actuated to effect a change in transmission speed ratio drive by positioning the throttle control linkage in a predetermined position and to associate with this control a means to maintain the condition of the control so established after the throttle control linkage has retracted from the above predetermined position. The speed ratio drive effected by the solenoid is thus maintained after the throttle control linkage has been moved from the above predetermined position.

Latching means adapted to accomplish the above purpose are described and claimed in the copending applications of Louis B. Forman, Serial No. 71,933, filed January 21, 1949 and Ira M. Holmes, Serial No. 71,874, filed January 21, 1949, now Patent No. 2,574,787.

It is an object of my invention to provide a latching means which constitutes an improvement over the mechanism described in the Forman application. My improved apparatus possesses advantages of simplicity and economy.

The transmission illustrated and described in Patent No. 2,348,763, issued on May 16, 1944 to A. J. Syrovy et al. and the copending application, Serial No. 374,674 of Neracher et al. are examples of transmissions to which the controls to be described herein may be applied.

In the drawings:

Fig. 3 is a side elevation of the carburetor and control of Fig. 1;

Fig. 4 is a partial elevation of the device illustrated in Fig. 3; and

Fig. 5 is a section on the line 5—5 of Fig. 4.

Figure 1:
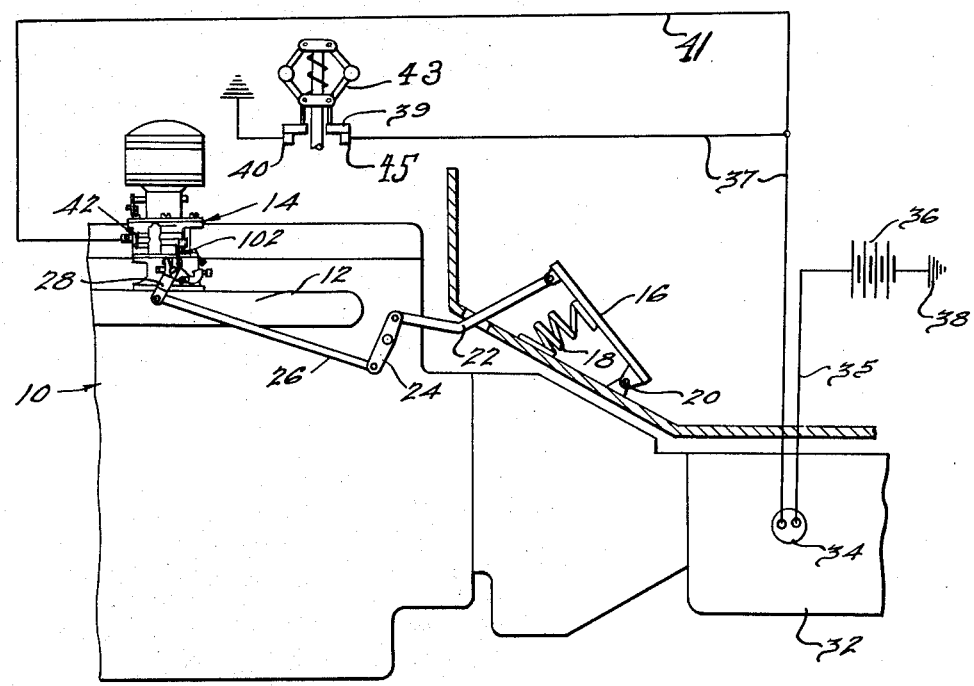
Fig. 1 is a diagrammatic view showing a portion of an automotive engine including a carburetor and a power transmission with the present invention applied thereto.

Certain abbreviated terminology will be adopted herein to facilitate the description of the invention. The means associated with the throttle control linkage and which is adapted to cause a relatively slow speed drive to be effected will be hereinafter referred to as a kickdown control. The means which limits the operation of the kickdown control to certain engine and vehicle speeds will be referred to as an upper limit control.

It is apparent that the control desired herein should be associated with some manipulation of the throttle linkage which will signal the operator's desire for an upshift and yet permit some latitude of vehicle operation with respect to engine speed during the relatively slow speed drive. The control, therefore, should be designed to initiate an upshift as the throttle is brought towards a throttle closing position beyond the lower limit of throttle opening that would normally be desired in the operation of the vehicle in its relatively slow speed drive.

The numeral 10 generally indicates an internal combustion engine having an intake manifold 12 on which is mounted a carburetor 14. The carburetor is provided with a conventional throttle valve 15 (Fig. 3) which is adapted to be manipulated by movement of an accelerator pedal 16. The pedal 16 is yieldably urged to its throttle closing position by a spring 18. Pedal 16 which is pivotally mounted at 20 has linkage operatively connected thereto for remote control of the throttle and this linkage is indicated by the numerals 22, 24, 26, 28 and shaft 30.

A variable speed ratio transmission has been generally indicated by the numeral 32 and is positioned rearwardly of the engine 10 and adapted to transmit drive from the engine 10 to a propeller shaft (not shown). U. S. Patent No. 2,348,763 and copending application, Serial No. 374,674, illustrate transmissions which could be controlled by the apparatus to be described herein. A solenoid actuator 34 illustrated as mounted on the side of the transmission 32 may be associated with the transmission control apparatus so that energization of the solenoid actuator 34 will effect a kickdown or downshift of the transmission to a relatively slow speed drive. Deenergization of the solenoid actuator 34 may be utilized to effect an upshift of the transmission to a relatively fast speed drive.

In Fig. 1 a typical circuit with which my invention may be associated for the control of the energization of solenoid actuator 34 has been illustrated as including a vehicle storage battery 36 which is grounded at 38. The circuit from the battery includes a conductor 35 connecting the battery to the solenoid actuator 34, a conductor 37 connecting solenoid actuator 34 to a grounded vehicle speed responsive governor 43 having terminals 40 and 45 and switch means 39 to electrically connect these terminals when the vehicle speed is less than a predetermined value. The circuit also includes a grounded kickdown control switch 42 incorporating my invention and connected by a conductor 41 to the conductor 37 so that the governor switch 39 and kickdown switch 42 are in parallel. The switches 39 and 42 are each operable when closed to ground the circuit. The governor 43 may be of any suitable design which is operatively connected to a driven portion of the transmission or other vehicle speed responsive members.

Operation of the kickdown control to be discussed herein is limited to those occasions on which the predetermined vehicle speed controlling the governor 43 has been exceeded so that the terminals 40 and 45 are not electrically connected. A kickdown control is not necessary below this predetermined speed as the governor switch 39 provides an energization of solenoid actuator 34 and a relatively slow speed drive.

Figure 2:
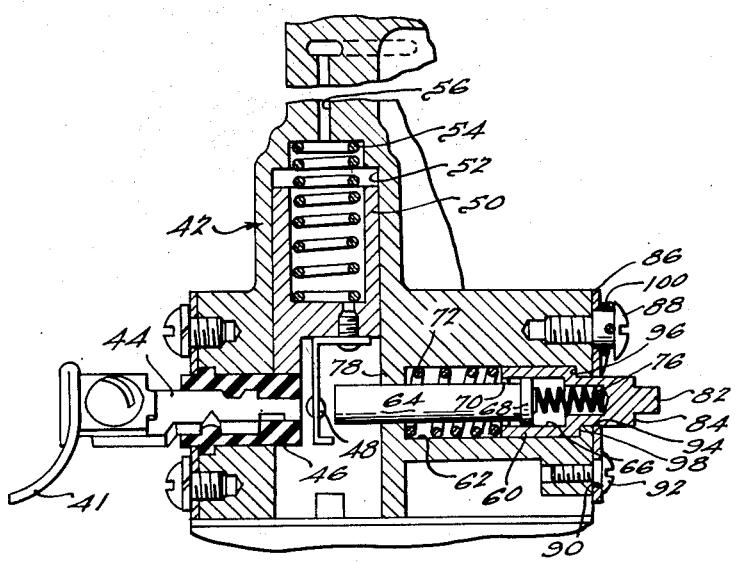
Fig. 2 is an enlarged sectional view illustrating the control mechanism applied to the carburetor shown in Fig. 1; a portion of the carburetor being broken away.

The kickdown control switch 42 is illustrated in detail in Figure 2. An electrical conductor 41, previously referred to, is connected with a first conductor terminal 44 which is electrically insulated at 46 from the supporting carburetor parts. A movable contacting conductor 48 of silver or other suitable material is connected to and extends downwardly from a piston 50. The conductor 48 is free from engagement with the first terminal 44 prior to operation of the kickdown control mechanism as hereinafter described. Conductor 48 is sufficiently resilient so that it can be flexed into contact with the terminal 44 and will assume its Figure 2 position again when the parts are in position as shown.

The piston 50 which is the movable portion of the upper limit control previously referred to is free to slide in a cylinder 52 and is urged downwardly therein by a spring 54 until the piston engages the insulation 46. The upper end of the piston is open to receive the spring 54 and the interior of cylinder 30 is connected by a passage 56 to the engine intake at the atmospheric side of the throttle valve 15 so that the piston 50 is always subjected to the vacuum existing on the atmospheric side of the throttle valve. It is preferable if the passage 56 is connected to the throat of the conventional carburetor venturi (not shown).

The spring 50 yieldably urges the piston 54 downwardly to the position illustrated in Figure 2 to position the contact 48 in line with the fixed terminal 44 for engagement therewith under the influence of the control mechanism unless the vacuum in the intake and passage 56 is sufficient to withdraw piston 50 and contact 48 upwardly out of alignment with the terminal 44.

Means are provided herein which are responsive to operation of the throttle control mechanism during a portion of its throttle opening movement and preferably during that portion thereof when the accelerator pedal 16 is brought to its fully depressed position corresponding to approximately full open position of the throttle valve 15, or an overtravel of the pedal beyond the full open throttle valve position, to ground the conductor 44 through contact 48. A plunger-like member 60 is slidably mounted in a cylinder 62 formed in the housing of switch 42. A second plunger-like member 64 is slidably received in a bore 66 provided in member 60. The members 60 and 64 are retained again relative separation in an axial direction by an enlarged portion 68 of the member 64 cooperating with an inwardly directed flange 70 carried by the member 60. The members 60 and 64 are yieldably urged to their Figure 2 position by a relatively heavy spring 72 which is positioned in cylinder 62. A spring 76 interposed directly between the members 60 and 64 urges the enlarged portion of the member 64 to the left as viewed in Figure 2 against the flange 70 of the member 60. The lever 28 which forms a part of the linkage connecting the accelerator pedal with the throttle valve, and which was previously referred to, is illustrated in Figure 3 as provided with an extension 80 adapted to contact the exterior end of member 60 when the pedal is depressed so that the throttle valve 15 is in substantially wide open throttle position. If desired, the contact of extension 80 with member 60 may be adjusted to occur in response to an overtravel of the pedal 16 beyond full open throttle position. In either event the extension 80 applies an axial force tending to move the member 60 to the left in Fig. 2 in response to contact of these parts. This movement occurs against the opposition of spring 72 and the plunger like member 64 is yieldably forced to the left in Fig. 2 by spring 76 until it flexes the contact terminal 48 into contact with the terminal 44. The conductor 41 is thus grounded through 44, 48, 64 and the parts within the bore 62 which are in electrical connection with the carburetor casing.

When, however, the vacuum on the atmospheric side of the throttle valve is sufficient to draw the piston 50 upwardly against the force of the spring 54 and thereby dispose the contact 48 out of alignment with the terminal 44 depression of the accelerator pedal 16 as aforesaid will not result in formation of the grounded electric circuit for the parts are so arranged that the plunger like member 64 does not have sufficient stroke under such circumstances to engage the terminal 44. A suitable stop 78 in the form of a shoulder on the switch housing is provided to limit the movement of the members 60 and 64.

Kickdown switches and upper limit control switches generally are recognized as devices heretofore employed in the art. However, in certain transmissions it is desirable to provide means for retaining the member 64, contact 48 and terminal 44 in electrical contact after the accelerator pedal 16 has initiated a kickdown and subsequently been retracted to a more modified throttle opening position. Therefore, I have found it desirable to provide a reduced end portion 82 on the member 60. This construction provides a shoulder 84 so located with respect to the axis of the member 60 that it comes substantially in the plane of the external surface of the switch housing when the member 60 is moved to the left by the extension 80 of throttle control linkage 28. Plate 86 which is adapted to cooperate with the shoulder 84 is pivotally mounted at 88 on the exterior of the switch housing in a plane normal to the axis of the member 60. The plate 86 is provided with a slot 90 and a screw 92 extends through the slot and is secured to the switch housing. The arcuate slot 90 serves as a guide for pivotal movement of the plate 86 in the plane transverse to the axis of member 60. The plate 86 is also provided with an opening 94 which is preferably located between the pivot 88 and the slot 90. The opening 94 has a diameter greater than the diameter of the larger extended portion of member 60 so that the axial movement referred to may be accommodated by movement of member 60 through the opening 94. The member 60 and the switch housing are preferably provided with cooperating shoulders 96 and 98 which limit the extent of movement of member 60 to the right as shown in Fig. 2. A spring 100 is positioned to react between plate 86 and the switch housing to normally urge the plate 86 to pivot or rotate in a clockwise direction in Fig. 4. It will be seen that this normally does not impair movement of member 60 until the shoulder 84 passes through the opening 94, at which time the clockwise movement of plate 86 under the influence of spring 100 causes the member 60 to be locked in position. This position corresponds to the extreme position assumed during its movement to the left in Fig. 2. This movement occurs under the influence of member 28 of the throttle control linkage and the shoulder 84 is so positioned that it passes through the opening 94 at the time when the member 64 is in contact with the contact 48 and the latter is in contact with the contact 44. The switch components are thus retained in the switch "on" position irrespective of subsequent movements of the throttle linkage.

In order to provide a means for opening the switch when an upshift is desired the lever 28 of the throttle control linkage is provided with an extension 102 having a cam element 104 formed thereon which is adapted to engage a portion of plate 86 when the throttle control linkage is retracted to a predetermined position. This predetermined position is preferably a position corresponding to a substantially closed throttle condition. The cam element 104 induces a counterclockwise rotation of plate 86 as an incident to retraction of the throttle control linkage. Sufficient counterclockwise rotation of plate 86 will realign opening 94 with the larger extended portion of member 60 so that the member 60 may extend through the opening 94 and be moved to the right in Fig. 2 under the influence of spring 72 until shoulders 96 and 98 engage thereby interrupting the electrical circuit, deenergizing solenoid actuator 34 and inducing an upshift in the transmission speed ratio drive. It is assumed of course that the governor switch is open at this time for it is only under these conditions that an operator would require the switch 42 to initiate an upshift.

I claim:

1. A control for an electrical circuit of a motor vehicle having a throttle and linkage operable to control the throttle; said control including a switch having a member movable to first and second positions and one of said positions effecting an electrical closing of said switch, spring means urging said member to one of said positions, means associated with the motor vehicle throttle control linkage and operable to move said member to the other of said positions as an incident to movement of said linkage beyond a first predetermined position, locking means operable to retain said member in one of said positions and comprising an element pivotally mounted on said switch for rotation about its pivot between first and second limits and operable to obstruct movement of said member toward one of its said positions when positioned at said first limit, spring means urging said element toward one of its limits and means associated with said throttle control linkage and operable to oppose said spring means and move said element toward the other of its limits as an incident to movement of said linkage beyond a second predetermined position.

2. A control for an electrical circuit of a motor vehicle; said control including a switch having a member movable to a first position effecting an electrical closing of said switch and a second position effecting an opening of said switch, a first means urging said member to said second position, mechanical means operable by the vehicle driver to move said member to said first position, locking means operable to retain said member in said first position and comprising an element rotatably mounted on said switch for movement between first and second limits and operable to obstruct movement of said member toward its second position when positioned at said first limit, spring means urging said element toward its first limit and third means operable by the vehicle driver to selectively oppose said spring means and move said element toward its second limit.

3. A control for an electrical circuit of a motor vehicle having a throttle and linkage operable to control the throttle; said control including a switch having a movable member, means associated with the motor vehicle throttle control linkage and operable to move said member to a switch closing position as an incident to movement of said linkage beyond a predetermined limit in a direction tending to open the vehicle throttle, an element rotatably mounted on said switch, spring means urging said element to rotate in a first direction, cam means associated with said throttle control linkage and operable to rotate said element in a second direction as an incident to movement of said linkage beyond a second predetermined position in a direction tending to close said throttle, said member being provided with a surface adapted to be engaged by said element when the latter is rotated in its first direction and said member is in its switch closing position thereby to lock said member in its switch closing position until released by said cam means.

4. A control for an electrical circuit of a motor vehicle having a throttle and linkage operable to control the throttle; said control including a switch having a housing, a first contact element and a second contact element, said second contact element having a portion thereof formed as a plunger and being slidably mounted in said switch housing for movement between a first position remote from said first contact element and a second position in electrical conducting relationship with said first contact element, spring means normally urging said second contact element to its first position, means associated with said linkage and operable to slide said plunger to said second position when said linkage is moved beyond a predetermined position in a direction tending to open said throttle, a plate pivotally mounted on said housing, a member secured to said housing and having a portion overlying said plate to maintain said plate normal to its pivotal axis, said plate having an opening through which said plunger extends, said plunger having an indentation so positioned that it is aligned with said plate when said plunger is in its second position, spring means associated with said plate and urging the latter to rotate so that a portion thereof adjacent said opening is received in said indentation when said plunger is in its second position and a cam means carried by said linkage and operable to engage a portion of said plate to pivot said plate in a direction to remove said plate portion from said indentation and release said plunger for return to its first position under the influence of said first mentioned spring means, said cam means being so positioned as to engage said plate in response to movement of said linkage beyond a predetermined limit in a direction tending to close said throttle.

5. A control for an electrical circuit of a motor vehicle having a throttle and linkage operable to control the throttle; said control including a switch having a housing, a first contact element and a second contact element, said second contact element having a portion thereof formed as a plunger and being slidably mounted in said switch housing for movement between a first position remote from said first contact element and a second position in electrical conducting relationship with said first contact element, spring means normally urging said plunger to its first position, means associated with said linkage and operable to slide said plunger to said second position when said linkage is moved beyond a predetermined position in a direction tending to open said throttle, a plate pivotally mounted on said housing in a plane normal to the axis of said plunger, said plunger having a shoulder so positioned that it is located in said plane when said plunger is in its second position, separate spring means associated with said plate and urging the latter to rotate so that a portion thereof abuts said shoulder when said plunger is in its second position to lock it therein and a cam means carried by said linkage and operable to engage a portion of said plate to pivot said plate away from said shoulder and release said plunger for return to its first position under the influence of said first mentioned spring means, said cam means being so positioned as to engage said plate in response to movement of said linkage beyond a predetermined limit in a direction tending to close said throttle.

6. A control for an electrical circuit of a motor vehicle having a throttle and linkage operable to control the throttle; said control including a switch having a housing, a first contact element and a second contact element, said second contact element having a portion thereof formed as a plunger and being slidably mounted in said switch housing for movement between a first position remote from said first contact element and a second position in electrical conducting relationship with said first contact element, spring means normally urging said plunger to its first position, means associated with said linkage and operable to slide said plunger to said second position when said linkage is moved beyond a predetermined position in a direction tending to open said throttle, a plate pivotally mounted on the exterior of said housing in a plane normal to the axis of said plunger, said plate having an opening through which one end portion of said plunger extends, said plunger having an indentation on the surface thereof so positioned that it is located in said plane when said plunger is in its second position, spring means associated with said plate and urging the latter to rotate so that the opening therein is disaligned with said plunger and a portion of the plate adjacent said opening cooperates with said indentation when said plunger is in its second position to lock it therein and a cam means carried by said linkage and operable to engage a portion of said plate to pivot said plate and realign the opening therein with said plunger and release said plunger for return to its first position under the influence of said first mentioned spring means, said cam means being so positioned as to engage said plate in response to movement of said linkage beyond a predetermined limit in a direction tending to close said throttle.

THOMAS M. BALL.

REFERENCES CITED

The following references are of record in the file of this patent:

UNITED STATES PATENTS

| Number | Name | Date |
| --- | --- | --- |
| 1,974,991 | Hutt | Sept. 25, 1934 |
| 2,396,551 | Boyce | Mar. 12, 1946 |